(12) United States Patent
Himeno et al.

(10) Patent No.: US 8,672,556 B2
(45) Date of Patent: Mar. 18, 2014

(54) MEMBER FOR ROLLING BEARING AND ROLLING BEARING

(71) Applicants: Yoshihide Himeno, Mie (JP); Kouya Oohira, Mie (JP); Masaki Egami, Mie (JP)

(72) Inventors: Yoshihide Himeno, Mie (JP); Kouya Oohira, Mie (JP); Masaki Egami, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/891,650

(22) Filed: May 10, 2013

(65) Prior Publication Data

US 2013/0301965 A1    Nov. 14, 2013

Related U.S. Application Data

(63) Continuation of application No. PCT/JP2011/051590, filed on Jan. 27, 2011.

(30) Foreign Application Priority Data

Jan. 28, 2010    (JP) ................................. 2010-017216

(51) Int. Cl.
*F16C 33/56*    (2006.01)

(52) U.S. Cl.
USPC ......................................... 384/527; 384/909

(58) Field of Classification Search
USPC .......................................... 384/527, 909, 492
See application file for complete search history.

(56) References Cited

U.S. PATENT DOCUMENTS 6,406,189 B1 * 6/2002 Boutreux et al. ............. 384/527
2010/0316315 A1 * 12/2010 Shimazu et al. ............. 384/445

FOREIGN PATENT DOCUMENTS

JP    2007-057011 A    3/2007
WO    WO 2009104743 A1 *    8/2009

OTHER PUBLICATIONS

Machine translation of JP2007-057011.*

* cited by examiner

*Primary Examiner* — Thomas R Hannon
(74) *Attorney, Agent, or Firm* — Hedman & Costigan, P.C.; James V. Costigan; Kathleen A. Costigan

(57) ABSTRACT

The present invention provides a member, for a resin-made rolling bearing, which has a low extent of a moisture absorption-caused change in its dimension and mechanical properties, keeps sufficiently high mechanical properties after the member absorbs moisture, and is excellent in its resistance to hydrolysis, grease deterioration, and heat and also provides the rolling bearing in which the member for the rolling bearing is used. A rolling bearing (7) has an inner ring (8), an outer ring (9), a plurality of rolling elements (10) interposed between the inner ring (8) and the outer ring (9), a crown-shaped cage (11) for retaining the rolling elements (10), and a seal (12) covering an opening disposed at a gap between the inner ring (8) and the outer ring (9). The cage (11) and the seal (12) are moldings of a resin composed of polyphthalamide resin.

11 Claims, 3 Drawing Sheets

MEMBER FOR ROLLING BEARING AND ROLLING BEARING

TECHNICAL FIELD

The present invention relates to a resin-made cage composing a rolling bearing, a member such as a seal for the rolling bearing, and the rolling bearing in which the member for the rolling bearing is used.

BACKGROUND ART

In rotating the rolling bearing incorporating the resin-made cage at a high speed, a centrifugal force generated owing to a high-speed rotation acts on a cage. As a result, the cage deforms. Owing to the deformation of the cage, the friction between the cage and balls held by the cage becomes high, which leads to an increase in the torque of the rolling bearing. An increase in the friction therebetween causes the bearing to generate heat. Further as a result of the deformation of the cage, the cage may contact an outer ring of the rolling bearing. Resin melts owing to frictional heat caused by the contact between the cage and the outer ring. As a result, there may be a case where the rolling bearing is prevented from rotating. Thus the resin-made cage to be incorporated in the rolling bearing which is used at a high-speed rotation is demanded not to be deformed by a mechanical and/or thermal stress.

To restrain the deformation of the resin-made cage for the rolling bearing which rotates at a high speed, it is necessary to increase the mechanical strength such as the modulus of elasticity of a resin composition to be molded into the cage. To this end, normally this requirement is dealt with by allowing the resin composition to contain a large amount of a fibrous reinforcing material such as glass fibers. For example, as materials of the resin-made cage for the rolling bearing, from the standpoint of securing the strength and heat resistance of the cage, a material composed of polyamide 66 (hereinafter referred to as PA66) resin or polyamide 6 (hereinafter referred to as PA6) and glass fibers added thereto is known (see patent document 1). A plastic seal containing the PA66 resin or the PA6 resin is also known (see patent documents 2 and 3).

Because synthetic resins such as the PA6 and the PA66 are formed by way of synthesis of monomers extracted from petroleum and a polymerization reaction thereof, carbon dioxide is exhausted when the synthetic resins are burnt to discard it for a thermal recycle. From life cycle assessment (LCA), a comprehensive measure for decreasing the exhaust amount of the carbon dioxide is demanded in the production of materials, injection molding, and the discard of products. Thus the use of resin materials consisting of plant-derived materials is proposed. Cases in which plant resins such as polylactic acid, polytrimethylene terephthalate (hereinafter referred to as PTT) resin, and polyamide 11 (hereinafter referred to as PA11) resin are applied to the rolling bearing are reported (see patent documents 4 and 5).

Regarding the deformation of the resin-made cage and that of the resin-made seal, in addition to the deformation thereof owing to a mechanical or thermal stress caused by the rotation of the rolling bearing, the resin-made cage and the resin-made seal deform owing to swelling and expansion caused by moisture absorption made by the resin itself. The rolling bearing is used in a wide range of fields such as home electrical appliance, cars, various industrial equipments, and the like. In dependence on a use, the rolling bearing is often used in an environment where it is exposed to rainwater, in an environment where rainwater penetrates thereinto, in an environment where humidity becomes high, and the like. It is necessary to select a material which is unlikely to be affected by humidity for the resin-made member, for the rolling bearing, which is used in the environment where it is affected by humidity.

PRIOR ART DOCUMENTS

Patent Documents

Patent document 1: Japanese Patent Application Laid-Open No. 2000-227120
Patent document 2: Japanese Patent Application Laid-Open No. 6-313436
Patent document 3: Japanese Patent Application Laid-Open No. 2003-269618
Patent document 4: Japanese Patent Application Laid-Open No. 2001-355638
Patent document 5: Japanese Patent Application Laid-Open No. 2009-204121

SUMMARY OF THE INVENTION

Problem to be Solved by the Invention

But the PA66 resin and the PA6 resin to be used in the inventions of the patent documents 1 through 3 have a high water absorption ratio, and the size of the member for the rolling bearing changes accordingly. Therefore generally the dimension of the cage and that of the seal are regulated in a moisture-absorbed state. But the strength and the modulus of elasticity of the cage and those of the seal after they absorb moisture become much lower than those before they absorb moisture. Thus based on the strength thereof after they absorb moisture, the dimensions thereof are designed. In addition, in the case where the PA66 resin and the PA6 resin are used for the seal, there occurs a problem that the gap between the seal and the inner ring as well as the outer ring changes owing to a dimensional change caused by moisture absorption, and thus the sealing performance of the seal unavoidably deteriorates.

Of the plant resins, the polylactic acid and the PTT resin are polyester resins and thus in dependence on an environment where they are used, for example, in the case where they are used in a high-temperature and high-moisture environment or in water, hydrolysis may accelerate. The PA11 resin which is polyamide resin has a lower modulus of elasticity than other resin materials generally used for the bearing and a larger centrifugal force-caused deformation when the bearing is in operation. For the above-described reasons, in the case where these plant resin materials are used for the cage of the bearing, it is necessary to set a limitation in a range in which they can be used.

The rolling bearing is used with a lubricating composition such as grease being filled therein. The grease is prepared by adding additives such as an extreme pressure agent, a rust-proofing agent, an antioxidant, a corrosion prevention agent, and the like as necessary to the base grease consisting of a base oil and a thickener. The cage and the seal contact the lubricating composition such as the grease inside the bearing and are thus affected thereby. In forming the cage and the seal of the PA66 resin and the PA6 resin used in the inventions of the patent documents 1 through 3, there is a fear that they lower in the mechanical strength thereof, and deterioration such as resin cracking occurs in dependence on the kind of the base oil, the thickener, and the additives contained in the grease and an environment such as temperature in which the cage and the seal are used. Particularly the cage and the seal are affected greatly by the additives. In the case where the extreme pressure agent consisting of a sulfur-based compound or a phosphorous-based compound is added to the base grease, the cage and the seal are liable to deteriorate. The present invention has been made to deal with the above-described problems. Therefore it is an object of the present invention to provide a member, for a resin-made rolling bearing, which has a low extent of a moisture absorption-caused change in its dimension and mechanical properties, keeps sufficiently high mechanical properties after the member absorbs moisture, and is excellent in its resistance to hydrolysis, grease deterioration, and heat. It is another object of the present invention to provide the rolling bearing in which the member for the rolling bearing is used.

Means for Solving the Problem

The member of the present invention for a rolling bearing is composed of a molding of a synthetic resin. The synthetic resin is polyphthalamide resin (hereinafter referred to as PPA resin) to be prepared by polymerizing monomers comprise 11-aminoundecanoic acid or its derivatives, benzenedicarboxylic acid or its derivatives, and diamines.

The synthetic resin is a synthetic resin composition composed of the PPA resin and at least a fibrous reinforcing material added thereto. The fibrous reinforcing material is glass fibers and/or carbon fibers. A mixing ratio of the fibrous reinforcing material to an entirety of the synthetic resin composition is not less than 10 wt % nor more than 60 wt %.

The PPA resin for the member of the present invention for the rolling bearing contains carbon 14 ($^{14}C$) which is a radioactive isotope. The member of the present invention for the rolling bearing is a molding to be formed by injection-molding the synthetic resin. The member of the present invention for the rolling bearing is used in an environment where the member contacts grease containing a sulfur-based compound or a phosphorous-based compound as an additive thereof.

The rolling bearing of the present invention for the rolling bearing has an inner ring, an outer ring, a plurality of rolling elements interposed between the inner ring and the outer ring, and a cage for retaining the rolling elements. At least one member selected from among the inner ring, the outer ring, the rolling elements, and the cage is the member of the present invention for the rolling bearing composed of the molding of the synthetic resin. The member for the rolling bearing is the cage. The cage is crown-shaped. Grease containing the sulfur-based compound or the phosphorous-based compound as an additive thereof is enclosed in the rolling bearing of the present invention.

The rolling bearing has a seal covering an opening disposed at a gap between the inner ring and the outer ring. The seal is the member, for the rolling bearing, composed of the molding of the synthetic resin.

Effect of the Invention

The member of the present invention for the rolling bearing is composed of the PPA resin to be prepared by polymerizing the monomers comprise the 11-aminoundecanoic acid or its derivatives, the benzenedicarboxylic acid or its derivatives, and the diamines or the molding of the synthetic resin composition composed of the polyphthalamide resin and at least the fibrous reinforcing material added thereto. Therefore the member of the present invention for the rolling bearing has a lower moisture absorption ratio than the member, for the rolling bearing, composed of the PA66 resin or the PA6 resin and thus has a smaller dimensional change and a lower degree of deterioration in its mechanical properties. In addition, because the member of the present invention for the rolling bearing contains the benzenedicarboxylic acid or its derivatives, the member of the present invention for the rolling bearing is excellent in its heat resistance. The PPA resin and the synthetic resin composition thereof are superior to the PA66 resin and the PA46 resin in the resistance to grease deterioration and can be preferably utilized as a material of the cage and seal of the bearing in which the grease containing the extreme pressure additive consisting of the sulfur-based compound or the phosphorous-based compound is used at a high ratio. Therefore the member of the present invention for the rolling bearing can be preferably utilized as the cage of the rolling bearing and the seal thereof.

In addition, because the PPA resin and the synthetic resin composition thereof which have absorbed moisture have a higher mechanical strength than the PA66 resin and PA6 resin which have absorbed moisture, the former can be thinned. In addition, the former which has absorbed moisture has a higher modulus of elasticity than the PA66 resin and PA6 resin which have absorbed moisture. Therefore the amount of centrifugal force-caused deformation of the former is small in a high-speed rotation. Thereby in the case where the former is used as the cage, the cage can be used without contacting the outer ring even in the high-speed rotation in the environment where the humidity becomes high.

Further because the matrix resin component of the PPA resin and the synthetic resin composition thereof contain the monomer component synthesized from plant, the PPA resin and the synthetic resin composition thereof are capable of making the carbon dioxide emission smaller than petroleum-derived synthetic resin such as the PA6 resin and the PA66 resin at a combustion time.

Because the cage and the seal which are the member of the present invention are used for the rolling bearing of the present invention, the rolling bearing is excellent in its sealing performance in the environment where the humidity becomes high and can be used in the high-speed rotation.

MODE FOR CARRYING OUT THE INVENTION

Figure 1:
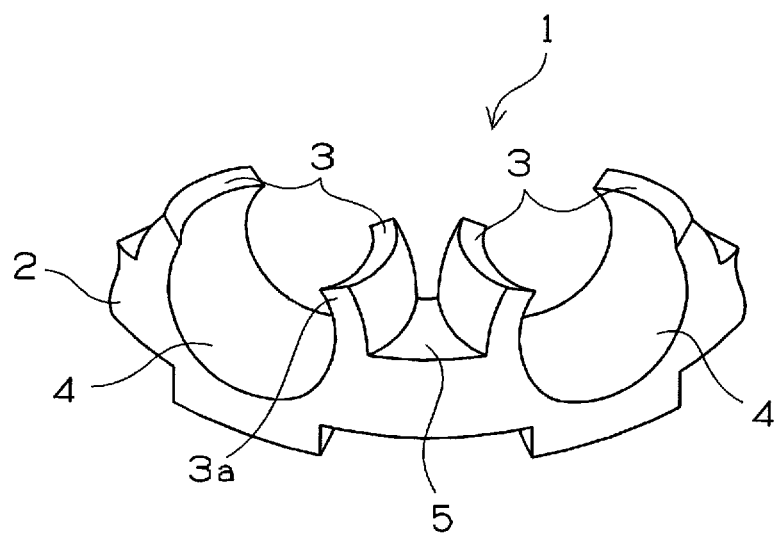
FIG. 1 is a partly enlarged perspective view of a resin-made crown-shaped cage.

The member of the present invention for the rolling bearing is a constituent element of the rolling bearing. More specifically, an inner ring, an outer ring, a rolling element, a cage, and a seal are listed as the member for the rolling bearing. In the present invention, a molding of PPA resin having a specific molecular structure or a molding of a synthetic resin composition composed of the PPA resin and at least a fibrous reinforcing material added thereto is the member for the rolling bearing.

The PPA resin to be used in the present invention is prepared by polymerizing monomers comprise (1) 11-aminoundecanoic acid or its derivatives, (2) benzenedicarboxylic acid or its derivatives, and (3) diamines. As a material having a resin matrix equivalent to the above-described polymer, Rilsan (registered trademark) HT produced by Arkema Inc. is exemplified.

(1) The 11-aminoundecanoic acid is a component derived from plant produced by subjecting castor oil extracted from seeds of "castor-oil plant" to a chemical reaction.

(2) The benzenedicarboxylic acid is an aromatic dibasic acid, the ortho form of which is phthalic acid, the metha form of which is isophthalic acid, and the para form of which is terephthalic acid. In the present invention, it is preferable to use the terephthalic acid to improve the heat resistance of the PPA resin. As the above-described acids, it is possible to use free acid, alkyl esters such as dimethyl terephthalate or acid halides such as acid chlorides as monomers. It is also possible to use water-added benzenedicarboxylic acid.

(3) As the diamines, it is possible to preferably use diamines in which two amino groups are bonded to an aliphatic hydrocarbon group or an alicyclic hydrocarbon group. Decamethylene diamine and undecamethylene diamine are exemplified.

In addition, the PPA resin can be modified with aliphatic hydrocarbon dibasic acid or alicyclic hydrocarbon dibasic acid.

Table 1 shows the properties of the PPA resin of the present invention and the PA66 resin. The melting point of the PPA resin is 240 to 260° C. The PPA resin can be molded in a condition equal to a condition in which the PA66 resin having a melting point of 260° C. is molded. The molding of the synthetic resin composition composed of the PPA resin and the fibrous reinforcing material added thereto has a water absorption ratio not more than 1/10 (see table 2 to be described later) of the molding of a PA66 resin composition. As compared with the molding of the PA66 resin composition whose tensile strength and tensile modulus of elasticity greatly lower after it absorbs moisture, the molding of the PPA resin composition has a characteristic that its tensile strength and tensile modulus of elasticity lower to a very low extent after it absorbs moisture and also a characteristic that it dimensionally changes to a low extent after it absorbs moisture.

cage, the seal, and the like of the rolling bearing composed of a lubricating composition such as grease containing an extreme pressure additive (sulfur compounds and phosphorous compounds to be described later) at a high ratio which is apt to attack the amide bond. As rolling bearings using grease containing a large amount of the above-described additive, a bearing for the axle of a railroad vehicle, a bearing for wind-generated power, and a bearing for an industrial motor are listed.

In the present invention, it is possible to use the fibrous reinforcing material without limiting the kind thereof, provided that they are favorably dispersed for the PPA resin and impart a strength thereto according to the object of a use. As the fibrous reinforcing material having a reinforcing effect, glass fibers; carbon fibers such as PAN-based carbon fibers and pitch-based carbon fibers; metal fibers such as aluminum fibers and brass fibers; mineral fibers; organic fibers such as whiskers and aromatic polyamide fibers are listed. These fibers can be used singly or as mixtures thereof.

In consideration of the reinforcing effect, it is favorable to use the fibrous reinforcing materials having a tensile modulus of elasticity of not less than 50 MPa. Of the above-described fibrous reinforcing materials, the glass fibers or the carbon fibers are especially favorable. The mixing amount of the fibrous reinforcing material for the entire synthetic resin composition is favorably 10 to 60 wt %. When the mixing amount of the fibers is less than 10 wt %, the modulus of elasticity of the fibrous reinforcing material is low. Thus there is a fear that a deformation amount of the member for the rolling bearing is large in a high-speed rotation. A composition containing more than 60 wt % of fibers is incapable of coping with forcible drawing at a molding time in forming a crown-shaped cage and thus crack and whitening may occur on a pocket surface of the cage or a claw portion thereof. The mixing amount of the fibrous reinforcing material for the entire synthetic resin composition is more favorably 15 to 50 wt % and most favorably 20 to 50 wt %.

TABLE 1

|  | PPA resin composition | | | | PA66 resin composition | |
| --- | --- | --- | --- | --- | --- | --- |
| Resin composition (wt %) | | | | | | |
| PPA resin *) | 50 | | 70 | | — | |
| PA66 resin | — | | — | | 75 | |
| Glass fiber | 50 | | 30 | | 25 | |
| Humidity-regulated and dried seal specimens | Drying | Moisture regulation | Drying | Moisture regulation | Drying | Moisture regulation |
| Density of resin composition (g/cm³) | 1.54 | — | 1.32 | — | 1.32 | — |
| Mechanical properties | | | | | | |
| Tensile strength (Mpa) | 171 | 165 | 155 | 137 | 172 | 127 |
| Tensile strain (%) | 1.9 | 1.9 | 3.0 | 2.8 | 3.7 | 4.3 |
| Tensile modulus of elasticity (Gpa) | 11.5 | 11.5 | 8.3 | 6.4 | 8.4 | 4.7 |
| Thermal properties | | | | | | |
| Melting point (° C.) | 255 | 255 | 255 | 255 | 260 | 260 |
| Glass transition point (° C.) | 86 | 86 | 86 | 86 | 58 | 58 |
| Biomass degree (%) | About 65 | About 65 | About 65 | About 65 | 0 | 0 |

*) Equivalent to resin matrix of Rilsan HT produced by Arkema

The PPA resin of the present invention is excellent in its chemical resistance and resistance to grease deterioration because the molecular chain thereof composing the amide bond is longer than that of the PA66 resin and PA46 resin and the amount of the amide bond contained therein is smaller than that of the amide bond contained in the PA66 resin and PA46 resin. Therefore the member of the present invention for the rolling bearing can be preferably used as a material of the In addition to the fibrous reinforcing material, the synthetic resin composition may contain a solid lubricant, an inorganic filler, an antioxidant, a pigment, a thermoplastic elastomer or a rubber component as necessary.

Because the member of the present invention for the rolling bearing is the molding of the PPA resin or the molding of its synthetic resin composition excellent in the mechanical, thermal, and chemical properties thereof, the member for the rolling bearing is capable of restraining its deformation caused by a high-speed rotation of the rolling bearing, swelling after moisture absorption, and expansion-caused deformation. It is necessary to mold the PA66 resin and the PA6 resin in consideration of a change of the properties thereof after they absorb moisture. On the other hand, in the present invention, it is unnecessary to do so. For example, it is unnecessary to design the member for the rolling bearing by taking into consideration an extra dimensional tolerance and strength to cover the deformation of the dimension thereof and the deterioration of the strength thereof when the member for the rolling bearing is used in an environment where the member absorbs moisture and in an environment where an external stress is applied thereto. Thus it is possible to thin the member for the rolling bearing.

The PPA resin can be produced as plant plastics in which the 11-aminoundecanoic acid whose starting material is castor oil is used. Whether or not the plant plastics are biomass-derived can be determined by measuring the concentration of carbon 14 ($^{14}C$) which is a radioactive isotope of carbons composing the resin. Because the half-life of $^{14}C$ is 5730 years, $^{14}C$ is not contained in carbon derived from a fossil resource which is generated in the elapse of not less than 10 million years. For this reason, when $^{14}C$ is contained in the carbon derived from the fossil resource, it is possible to determine that the plant plastic contains at least the biomass-derived material.

By using the PPA resin containing the biomass-derived material, it is possible to make the exhaust amount of carbon dioxide caused by incineration of the member for the rolling bearing such as the resin-made cage and the resin-made seal smaller than the exhaust amount of carbon dioxide caused by the incineration of the existing member, for the rolling bearing, which does not contain the biomass-derived material.

The member of the present invention for the rolling bearing is formed by molding the PPA resin or the synthetic resin composition thereof. As a molding method, injection molding, extrusion molding, insert molding, and blow molding can be used. These molding methods can be adopted in consideration of the kind of the member such as the cage and the seal for the rolling bearing and the kind and mixing amount of the fibrous reinforcing material contained in the synthetic resin composition. After the synthetic resin composition is molded, the synthetic resin composition may be shaped into an intended configuration by mechanical processing. The injection molding is preferable from the standpoint of the production cost. The injection molding is especially preferable when the member for the rolling bearing is the crown-shaped cage having a complicated configuration or is the seal formed by molding the PPA resin or the synthetic resin composition thereof integrally with a metal.

The member of the present invention for the rolling bearing can be used as the molding of the PPA resin or the molding of the synthetic resin composition composed of the PPA resin and the fibrous reinforcing material added thereto according to the kind, size, use of the rolling bearing, and the kind of the member. For example, in the case of the crown-shaped cage, the molding of the synthetic resin composition is preferable.

Figure 2:
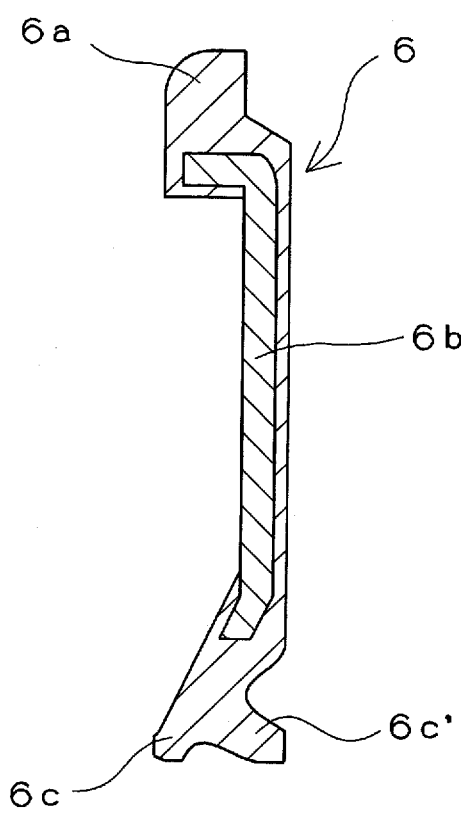
FIG. 2 is a sectional view of a resin-made seal.

As examples of the member of the present invention for the rolling bearing, a cage and a seal formed by injection-molding the synthetic resin composition are shown in FIGS. 1 and 2 respectively. FIG. 1 is a partly enlarged perspective view of a crown-shaped resin-made cage which is an example of the member of the present invention for the rolling bearing. As shown in FIG. 1, in a cage 1, two pairs of opposed retention claws 3 are formed on an upper surface of an annular cage body 2 at a certain interval in its circumferential direction, and the opposed retention claws 3 of each pair are curved in an approach direction, and a pocket 4 for retaining a ball serving as a rolling element is formed between the opposed retention claws 3. A flat portion 5 is formed as a reference plane from which the retention claws 3 rise between the back surface of one of one pair of the opposed retention claws 3 between which the pocket 4 is formed and that of one of the other pair of the opposed retention claws 3 between which the adjacent pocket 4 is formed. The retention claw 3 has a curved distal portion 3a.

Because the cage 1 is a molding of the synthetic resin composition, even after the cage 1 absorbs moisture, the cage 1 is capable of keeping a higher modulus of elasticity than moldings made of the PA66 resin and the PA6 resin and thus the amount of centrifugal force-caused deformation at a high-speed rotation is small. Therefore the cage 1 can be used without contacting the outer ring at even a high-speed rotation. In injection-molding the cage 1, the curved distal portion 3a of the retention claw 3 is forcibly drawn out of a die when the cage 1 is taken out of the die. In this operation, it is possible to restrain the cage 1 from being cracked or whitened because the synthetic resin composition is used for the cage 1.

FIG. 2 is a sectional view of a resin-made seal which is another example of the member of the present invention for the rolling bearing. As shown in FIG. 2, a seal 6 has a peripheral edge 6a to be locked to a locking groove of a sealing member formed on an inside diameter surface of an outer ring of the bearing, a metal plate (core) 6b for reinforcing the seal 6, seal lips 6c, 6c' which slide along a sealing groove circumferentially formed at both sides of an inner ring raceway of the bearing.

Because the seal 6 is a molding of the synthetic resin composition except the metal plate 6b, the seal 6 has a lower moisture absorption ratio than seals made of the PA66 resin and the PA6 resin and thus has a small dimensional change. Therefore when the seal 6 is used in an environment where the humidity becomes high, it is possible to prevent the sealing performance thereof from deteriorating. It is possible to form the entire seal 6 as the molding of the PPA resin or that of the synthetic resin composition containing the PPA resin without using the metal plate 6b.

Figure 3:
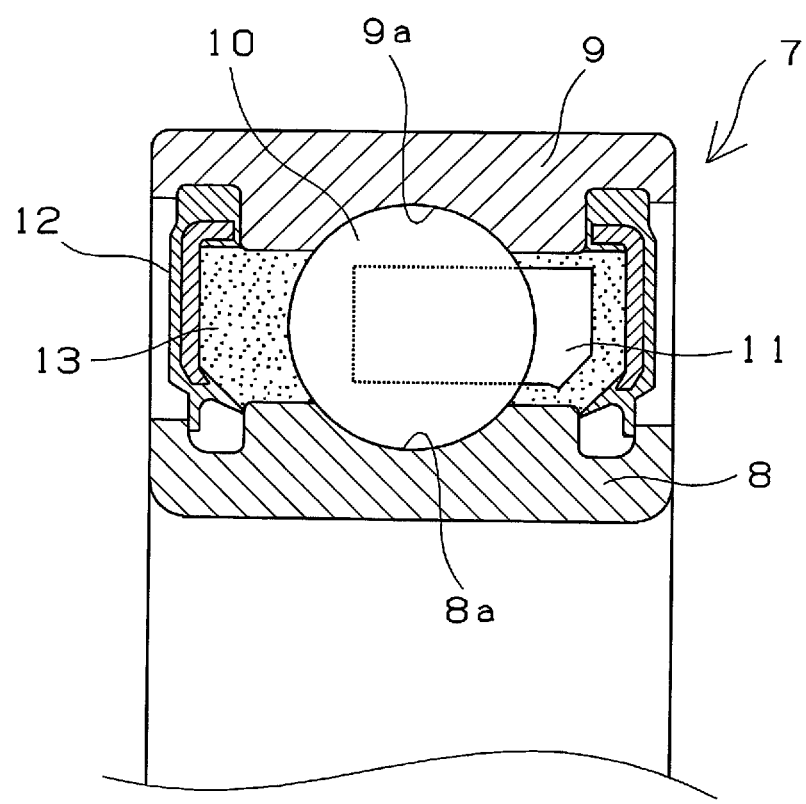
FIG. 3 is a sectional view of a rolling bearing (grease-enclosed deep groove ball bearing).

An example of the rolling bearing of the present invention is described below with reference to FIG. 3. FIG. 3 is a sectional view of the rolling bearing (grease-enclosed deep groove ball bearing). In a rolling bearing, an inner ring 8 having a rolling surface 8a on its outer circumferential surface and an outer ring 9 having a rolling surface 9a on its inner circumferential surface are concentrically disposed. A plurality of rolling elements 10 is interposed between the rolling surface 8a of the inner ring 8 and the rolling surface 9a of the outer ring 9. A plurality of the rolling elements 10 is retained by a crown-shaped cage 11. A seal 12 covering an opening disposed at the gap between the inner ring 8 and the outer ring 9 is fixed to the outer ring 9. A lubricating grease 13 is enclosed on the circumferences of the rolling elements 10.

At least one member selected from among the inner ring 8, the outer ring 9, the rolling elements 10, the cage 11, and the seal 12 is the member of the present invention for the rolling bearing, namely, the molding of the PPA resin or that of the synthetic resin composition thereof. For example, by forming the cage 11 and the seal 12 as the molding of the synthetic resin composition, as described above, the bearing is excellent in its sealing performance, can be rotated at a high speed even in the environment where the humidity becomes high, and is allowed to decrease the exhaust amount of carbon dioxide in a disposal operation.

The base oil of the lubricating grease 13 is not limited to a specific one, but it is possible to use base oils generally used in the field of the grease. For example, it is possible to use mineral oil, animal and plant oil, ester synthetic oil, synthetic hydrocarbon oil, ester phosphate oil, silicone oil, fluorine oil, and mixed oils of these oils. The thickener of the lubricating grease 13 is not limited to a specific one, but it is possible to use thickeners generally used in the field of the grease. For example, it is possible to use a metal soap-based thickener such as metal soap, composite metal soap; and a nonmetal soap-based thickener such as Bentone, silica gel, urea compounds, urea-urethane compounds, and fluororesin. As the metal soap, sodium soap, calcium soap, aluminum soap, and lithium soap are listed. As the urea compounds and the urea-urethane compounds, diurea compounds, triurea compounds, tetraurea compounds, other polyurea compounds, and diurethane compounds are listed.

The lubricating grease 13 may contain known additives as necessary. As such additives, an extreme pressure additive consisting of a sulfur-based compound or a phosphorous-based compound; a rust-proofing agent such as sorbitan ester; an antioxidant such as amine compounds and phenolic compounds; a corrosion inhibitor such as sodium nitrite and sodium sebacate; a solid lubricant such as graphite, molybdenum disulfide, and polytetrafluoroethylene resin; an oily agent such as fatty acid amide, aliphatic acid, amine, and lipids; and a viscosity index improver such as polymethacrylate and polystyrene are listed. The lubricating grease 13 may contain these additives singly or in combination of not less than two kinds thereof.

As the sulfur-based compound, sulfide compounds such as dibenzyl sulfide, sulfurized olefin, and sulfurized fats and oils are listed. As the phosphorous-based compound, phosphate ester such as trioctylphosphate, tricresylphosphate and phosphite ester are listed. As a sulfur-phosphorous based compound, zinc dithiophosphate and molybdenum dithiophosphate are exemplified.

By forming the cage 11 and the seal 12 in the form of the molding of the PPA resin or that of the synthetic resin composition thereof, the cage 11 and the seal 12 are excellent in its resistance to grease deterioration. In the case where the lubricating grease 13 contains the extreme pressure additive consisting of the sulfur-based compound or the phosphorous-based compound, the cage 11 and the seal 12 are capable of restraining the deterioration of the mechanical strength thereof and the resin thereof from cracking.

As a method of lubricating the rolling bearing of the present invention, in addition to the grease lubrication, any of oil lubrication, air oil lubrication, and solid lubrication can be adopted. In the case of the grease lubrication and the lubrication to be performed by using oil, it is possible to use not only a material, derived from fossil resource such as mineral oil, which has been conventionally used, but also a material to which biodegradability has been imparted and a material derived from biomass. The rolling bearing of the present invention may be of any type of a ball bearing, a tapered roller bearing, a self-aligning roller bearing, and a needle roller bearing.

EXAMPLES

Examples 1 Through 5 and Comparative Examples 1 Through 5

In the examples 1 through 5, the member of the present invention for the rolling bearing was applied to a resin-made cage. Materials each having the composition shown in table 2 were injection-molded to prepare JIS No. 1 dumbbells. After moisture was regulated at 80° C. and a relative humidity of 95% for three hours, specimens each consisting of a resin molding were prepared. The water absorption ratio of each of the prepared resin molding specimens was measured from the weight thereof before and after the moisture was regulated by using a computing equation shown below. Thereafter each resin molding specimen was subjected to a tensile test (JIS K 7113) to measure the tensile strength, tensile strain, and tensile modulus of elasticity thereof. The dumbbell specimens before the moisture was regulated were subjected to a test for examining the resistance thereof to hydrolysis. Table 2 shows the results.

<Computing Equation of Water Absorption Ratio>

The water absorption ratio of each resin molding specimen was computed from the weight thereof before and after moisture was regulated by using the computing equation shown below:

Water absorption ratio (wt %)=[(weight after moisture was regulated)−(weight before moisture was regulated)×100/(weight before moisture was regulated)]

<Hydrolytic Resistance Test>

The dumbbell specimens before the moisture was regulated were left in a high-temperature and high-humidity bath where the temperature and the humidity were adjusted to 80° C. and 95% RH respectively. After the dumbbell specimens were taken out of the bath and dried after the elapse of 1500 hours to measure the tensile strength thereof in the tensile test (JIS K 7113). The tensile strengths before the moisture was regulated were compared with each other. The mark of "◯" was given to the dumbbell specimens whose strength retention ratios was not less than 70% after the humidity was regulated and they were dried. The mark of "x" was given to the dumbbell specimens whose strength retention ratios were less than 70% after the humidity was regulated and they were dried.

Cages composed of materials each having the composition shown in table 2 were prepared and subjected to a cage-forming test. After the moldability of each cage was evaluated, it was incorporated in a ball bearing (bearing number 608) to prepared bearing specimens for use in a bearing high-speed rotation test. The prepared bearing high-speed specimens were subjected to the bearing high-speed rotation test shown below to measure the number of rotations until before the cage specimens contacted the outer ring and fused. Table 2 shows the results.

<Cage-Forming Test>

Materials each having the composition shown in table 2 were injection-molded to prepared specimens of crown-shaped cages for the ball bearing (bearing number: 608, outer diameter: 22 mm, inner diameter: 8 mm, width: 7 mm). A pocket portion of each of the cage specimen formed by molding the materials were observed visually or with an optical microscope. Cage specimens where crack and whitening were not found were evaluated as being excellent in moldability. The mark of "○" was given thereto. Specimens where crack and whitening were found were evaluated as being inferior in moldability. The mark of "x" was given thereto.

<High-Speed Rotation Test of Bearing>

After grease (MULTEMP SRL produced by KYODO YUSHI CO., LTD.) was enclosed in each of the prepared bearing specimens subjected to the bearing high-speed rotation test at 15 vol % in a space volume ratio, the number of rotations was gradually increased at a room temperature (25° C.) to operate the bearing specimens at a high speed. The number of rotations of each bearing specimen until before the cage contacted the outer ring and fused was recorded. Bearing specimens which could be operated at not less than 120000 rpm were evaluated as being excellent in the rotational performance thereof at a high speed. The mark of "○" was given thereto. Bearing specimens that could be operated at less than 120000 rpm were evaluated as being inferior in the rotational performance thereof at a high speed. The mark of "x" was given thereto.

<Overall Evaluation>

Specimens to which the mark of ○ was given in any of the hydrolysis resistance test, the cage-forming test, and the bearing high-speed rotation test were evaluated as being comprehensively excellent, and the mark of ○ was given thereto. Specimens other than the above-described ones were evaluated as being inferior and the mark of "x" was given thereto.

Examples 6 Through 10 and Comparative Example 6

In the examples 6 through 10 and the comparative example 6, the member of the present invention for the rolling bearing was applied to a resin-made seal. By using the resin composition of the examples 1 through 5 and that of the comparative example 1 shown in table 2, seal specimens were prepared. As shown in FIG. 2, each seal specimen had a metal plate (core) for reinforcing the seal. As described below, the sealing performance of each seal specimen was evaluated. Humidity-regulated seal specimens were prepared by regulating humidity at 80° C. and 95% relative humidity for three hours. Dried seal specimens were prepared by drying seal specimens at 150° C. for three hours. A test for examining the sealing performance of each of the prepared humidity-regulated and dried seal specimens shown below was conducted to compute the grease leak ratio of each seal specimen. Table 3 shows the results.

<Test for Examining Sealing Performance of Bearing>

After grease (MULTEMP SRL produced by KYODO YUSHI CO., LTD.) was enclosed at 35 vol % in a space volume ratio in ball bearings (bearing number: 608) each using an iron plate cage. The humidity-regulated and dried

TABLE 2

| | Example | | | | | Comparative example | | | | |
|---|---|---|---|---|---|---|---|---|---|---|
| | 1 | 2 | 3 | 4 | 5 | 1 | 2 | 3 | 4 | 5 |
| Resin composition (wt %) | | | | | | | | | | |
| PPA resin *) | 50 | 60 | 70 | 80 | 85 | — | 100 | — | — | — |
| PA66 resin | — | — | — | — | — | 75 | — | 30 | — | — |
| PA11 resin | — | — | — | — | — | — | — | — | — | 70 |
| PTT resin | — | — | — | — | — | — | — | — | 70 | — |
| Glass fiber | 50 | 40 | 30 | 20 | — | 25 | — | 70 | 30 | 30 |
| Carbon fiber | — | — | — | — | 15 | — | — | — | — | — |
| Properties of resin molding | | | | | | | | | | |
| Tensile strength (Mpa) | 171 | 160 | 155 | 130 | 140 | 127 | 41 | — | 145 | 131 |
| Tensile strain (%) | 1.9 | 2.4 | 3.0 | 3.5 | 2.4 | 4.3 | >70 | — | 2.0 | 5.8 |
| Tensile modulus of elasticity (Gpa) | 11.5 | 9.0 | 8.3 | 7.5 | 8.3 | 4.7 | 0.9 | — | 10.4 | 6.5 |
| Melting point (° C.) | >240 | >240 | >240 | >240 | >240 | 260 | >240 | — | 230 | 190 |
| Water absorption ratio (wt %) | 0.2 | 0.4 | 0.4 | 0.6 | 0.5 | 5 | — | — | 0.1 | 0.3 |
| Hydrolysis resistance test | ○ | ○ | ○ | ○ | ○ | ○ | ○ | ○ | X | ○ |
| Moldability of cage | ○ | ○ | ○ | ○ | ○ | ○ | ○ | X | ○ | ○ |
| Bearing high-speed rotation test | ○ | ○ | ○ | ○ | ○ | X | X | — | ○ | X |
| Overall judgment | ○ | ○ | ○ | ○ | ○ | X | X | X | X | X |

*) Equivalent to resin matrix of Rilsan HT produced by Arkema

The cage specimens of the examples 1 through 5 had a low water absorption ratio and after the humidity was regulated, they had a sufficiently higher strength and elastic modulus respectively than the cage specimen of the comparative example 1 composed of the existing materials. That is, the resin-made cage specimens of the examples 1 through 5 were made thinner than the resin-made cage specimen designed in the existing manner and thus allow the bearing to be light-weight and have a low torque. In addition, the cage specimens of the examples 1 through 5 had a high elastic modulus and a small centrifugal force-caused deformation amount respectively when the rolling bearing was rotated at a high speed. Thus the cage specimens of the examples 1 through 5 can be used without contacting the outer ring when the rolling bearing is rotated at a high speed (not less than 120000 rpm).

seal specimens were incorporated in the ball bearings to prepared bearing specimens. The bearing specimens were operated at 20000 rpm for two hours with an axial load of 29.7N and a radial load of 29.7N being applied thereto. The grease leak ratio (wt %) was computed from the weight of the bearing specimen before and after the bearing specimens were operated and the weight of the enclosed grease by using a computing equation shown below. The grease leak ratio shown in table 3 is the average of values obtained from three bearing specimens.

Grease leak ratio (wt %)=[(weight of bearing before sealing performance test)−(weight of bearing after sealing performance test)]×100/weight of enclosed grease

TABLE 3

|  | Example | | | | | Comparative example |
|---|---|---|---|---|---|---|
|  | 6 | 7 | 8 | 9 | 10 | 6 |
| Resin composition used | Example 1 | Example 2 | Example 3 | Example 4 | Example 5 | Comparative example 1 |
| Grease leak ratio (wt %) | | | | | | |
| Humidity-regulated seal | 2.9 | 2.5 | 2.7 | 2.8 | 2.8 | 3.0 |
| Dried seal | 3.1 | 2.8 | 2.9 | 3.0 | 2.9 | 6.8 |

In seal specimens of the examples 6 through 10, there was no difference between the sealing performance of the humidity-regulated seal specimen and that of the dried seal specimen. The seal specimens of the examples 6 through 10 had preferable results. The seal specimens of the examples 6 through 10 had a low water absorption ratio. Thus it is considered that there was little dimensional change between the humidity-regulated seal and the dried seal. The humidity-regulated seal specimen of the comparative example 6 showed a sealing performance similar to that of the seal specimens of the examples 6 through 10, but in the case of the dried seal specimen of the comparative example 6, the gap between the seal specimen and the inner ring as well as the outer ring was large. Thus the sealing performance of the dried seal specimen of the comparative example 6 was inferior to that of the dried seal specimens of the examples 6 through 10.

<Test for Examining Resistance to Grease Deterioration>

Lithium soap grease for experimental use [contained (16.0 wt % of thickener for entire grease, mineral oil (additive-free turbine oil ISO VG32) used as the base oil, and 3.0 wt % of sulfurized olefin (Anglamol 33 produced by Lubrizol Corporation) used for the entire grease as a sulfur-based additive] was made as a trial product. A No. 1 dumbbell specimen of the PPA resin composition and that of the PA66 resin composition were immersed in the grease. The grease in which the resin dumbbell specimens were immersed was allowed to stand in a high-temperature bath having a temperature of 140° C. for 1500 hours to deteriorate the resin dumbbell specimens. The tensile strength of each of the deteriorated resin dumbbell specimens was measured in a tensile test (JIS K 7113). The tensile strength retention rate (%) of each of the deteriorated resin dumbbell specimens was found from the tensile strength thereof before and after the test was conducted.

TABLE 4

|  | PPA resin composition | | PA66 resin composition Comparative example 1 |
|---|---|---|---|
|  | Example 1 | Example 3 | |
| Resin composition (wt %) | | | |
| PPA resin *) | 50 | 70 | — |
| PA66 resin | — | — | 75 |
| Glass fiber | 50 | 30 | 25 |
| Strength retention ratio (%) | | | |
| 500 hours | 83.8 | 84 | 82.1 |
| 1000 hours | 71.7 | 74.3 | 54.6 |
| 1500 hours | 68.2 | 68.4 | 47.4 |

*) Equivalent to resin matrix of Rilsan HT produced by Arkema

As indicated in table 4, the member of the present invention for the rolling bearing is excellent in the resistance to grease deterioration.

An example of the method of producing the PPA resin (equivalent to resin matrix of Rilsan HT produced by Arkema Inc.) forming the member of the present invention for the rolling bearing is described below. 12.2 kg of terephthalic acid, 12.65 kg of decanediamine, 10.15 kg of 11-aminoundecanoic acid, 10 L of water, 175 g of a chain-limiting agent (stearic acid), and 1.4 g of a defoamer (Siliconol 1000) were introduced into a reactor having a volume of 100 L. The mixture was heated to 150° C. and allowed to stand at five bars for two hours. Thereafter the pressure was lowered to 20 bars, and the mixture was heated to 270° C. To prepare the PPA resin (polymer), it took two hours to lower the pressure to the atmospheric pressure before purging nitrogen for 45 minutes. The intrinsic viscosity of the PPA resin in metacresol was 1.27 dl/g, and the melt flow index thereof was 3.0 g/10 minutes at 275° C. under a load of 2.16 kg. A DSC (differential scanning calorimetry, ISO11357 standard, 20° C./minute) showed fusion peaks at 243° C. and 259° C. when the PPA resin was heated twice. Tan δ measured by a DMA (dynamic viscoelasticity measuring apparatus, dry) was about 100° C.

INDUSTRIAL APPLICABILITY

As compared with the case in which the general-purpose PA66 resin is used, the member of the present invention for the rolling bearing has a low extent of a moisture absorption-caused change in its dimension and mechanical properties and has sufficiently high mechanical properties after the member absorbs moisture. Therefore the member for the rolling bearing can be preferably utilized as the cage and seal of the rolling bearing which is used in the environment where the humidity becomes high.

EXPLANATION OF REFERENCE NUMERALS AND SYMBOLS

| 1: | cage |
|---|---|
| 2: | cage body |
| 3: | retention claw |
| 4: | pocket |
| 5: | flat portion |
| 6: | seal |
| 7: | rolling bearing |
| 8: | inner ring |
| 9: | outer ring |
| 10: | rolling element |
| 11: | cage |
| 12: | seal |
| 13: | lubricating grease |

What is claimed is:

1. A rolling bearing comprising an inner ring, an outer ring, a plurality of rolling elements interposed between said inner ring and said outer ring, and a cage for retaining said rolling elements,
   wherein at least one member selected from among said inner ring, said outer ring, said rolling elements, and said cage is a molding of a synthetic resin composition comprising a polyphthalamide resin and at least a fibrous reinforcing material added thereto, said polyphthalamide resin being prepared by polymerizing monomers which comprise 11-aminoundecanoic acid or derivatives thereof, benzenedicarboxylic acid or derivatives thereof, and diamines.

2. A rolling bearing according to claim 1, wherein said fibrous reinforcing material is at least one fiber selected from among glass fibers and carbon fibers.

3. A rolling bearing according to claim 2, wherein a mixing ratio of said fibrous reinforcing material to an entirety of said synthetic resin composition is not less than 10 wt % nor more than 60 wt %.

4. A rolling bearing according to claim 1, wherein said polyphthalamide resin contains carbon 14 ($^{14}C$) which is a radioactive isotope.

5. A rolling bearing according to claim 1, wherein said at least one member selected from among said inner ring, said outer ring, said rolling elements, and said cage is a molding formed by injection-molding said synthetic resin composition.

6. A rolling bearing according to claim 1, wherein said at least one member selected from among said inner ring, said outer ring, said rolling elements, and said cage is used in an environment where said at least one member contacts grease containing a sulfur-based compound or a phosphorous-based compound as an additive thereof.

7. A rolling bearing according to claim 6, wherein said grease containing said sulfur-based compound or said phosphorous-based compound as said additive thereof is enclosed.

8. A rolling bearing according to claim 1, wherein said at least one member selected from among said inner ring, said outer ring, said rolling elements, and said cage is said cage.

9. A rolling bearing according to claim 8, wherein said cage is crown-shaped.

10. A rolling bearing comprising an inner ring, an outer ring, a plurality of rolling elements interposed between said inner ring and said outer ring, a cage for retaining said rolling elements, and a seal covering an opening disposed at a gap between said inner ring and said outer ring,
    wherein said seal is a molding of a synthetic resin composition comprising a polyphthalamide resin and at least a fibrous reinforcing material added thereto, said polyphthalamide resin being prepared by polymerizing monomers which comprise 11-aminoundecanoic acid or derivatives thereof, benzenedicarboxylic acid or derivatives thereof, and diamines.

11. A rolling bearing according to claim 10, wherein grease containing a sulfur-based compound or a phosphorous-based compound as an additive thereof is enclosed.

* * * * *